United States Patent
Lim et al.

(10) Patent No.: US 10,754,635 B2
(45) Date of Patent: Aug. 25, 2020

(54) SERVER FOR PROVIDING SOFTWARE PLATFORM AND METHOD OF OPERATING SERVER

(71) Applicant: SAMSUNG ELECTRONICS CO., LTD., Suwon-si (KR)

(72) Inventors: Geun-sik Lim, Suwon-si (KR); Myung-joo Ham, Seoul (KR); Gyung-pyo Hong, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/980,334

(22) Filed: May 15, 2018

(65) Prior Publication Data

US 2018/0373520 A1    Dec. 27, 2018

Related U.S. Application Data

(60) Provisional application No. 62/506,758, filed on May 16, 2017, provisional application No. 62/506,165, filed on May 15, 2017.

(30) Foreign Application Priority Data

May 2, 2018    (KR) .................. 10-2018-0050463

(51) Int. Cl.
*G06F 8/61* (2018.01)
*H04L 29/08* (2006.01)
(Continued)

(52) U.S. Cl.
CPC .................. *G06F 8/63* (2013.01); *G06F 8/36* (2013.01); *H04L 41/082* (2013.01);
(Continued)

(58) Field of Classification Search
CPC ............... G06F 8/63; G06F 8/36; H04L 67/34
See application file for complete search history.

(56) References Cited

U.S. PATENT DOCUMENTS

| 9,323,519 B2 | 4/2016 | Faus et al. |
| 2003/0200532 A1 | 10/2003 | Gensel |

(Continued)

OTHER PUBLICATIONS

International Search Report and Written Opinion dated Feb. 19, 2019 issued by the International Searching Authority in counterpart International Patent Application No. PCT/KR2018/006983. (PCT/ISA/210, PCT/ISA/220 and PCT/ISA/237).

*Primary Examiner* — Wei Y Zhen
*Assistant Examiner* — Amir Soltanzadeh
(74) *Attorney, Agent, or Firm* — Sughrue Mion, PLLC

(57) ABSTRACT

A method of operating a server for providing a software platform includes the operations of receiving, from a client device, information about an electronic device on which the software platform is to be mounted; transmitting, to the client device, information about software packages mountable on the electronic device; receiving, from the client device, a request for information about a first software package selected from among the software packages; detecting a second software package associated with the first software package; transmitting, to the client device, the information about the first software package and information about the second software package; and creating a platform image, based on software packages selected by the client device.

18 Claims, 10 Drawing Sheets

(51) Int. Cl.
*G06F 8/36* (2018.01)
*H04L 12/24* (2006.01)

(52) U.S. Cl.
CPC .......... *H04L 67/1095* (2013.01); *H04L 67/34* (2013.01); *H04L 67/02* (2013.01)

(56) References Cited

U.S. PATENT DOCUMENTS

| | | | |
|---|---|---|---|
| 2008/0163197 A1* | 7/2008 | Rao | G06F 8/61 717/177 |
| 2008/0163199 A1 | 7/2008 | Rao et al. | |
| 2009/0063502 A1 | 3/2009 | Coimbatore et al. | |
| 2009/0064086 A1* | 3/2009 | Faus | G06F 8/658 717/100 |
| 2009/0228867 A1 | 9/2009 | Bandyopadhyay et al. | |
| 2009/0300641 A1* | 12/2009 | Friedman | G06F 11/3664 718/104 |
| 2011/0029881 A1* | 2/2011 | Smith | G06F 8/60 715/735 |
| 2011/0265073 A1 | 10/2011 | Vidal et al. | |
| 2013/0031214 A1 | 1/2013 | Nielsen | |
| 2014/0007057 A1* | 1/2014 | Gill | G06F 8/61 717/126 |
| 2015/0317145 A1 | 11/2015 | Katariya et al. | |

* cited by examiner

FIG. 8A

Q Start typing to filter list of packages  [<] [>]

⊕ ☑ Tizen Native API Sets
⊖ ☑ Tizen Platform Internal Feature Sets
  ⊕ ☑ Boot Animation packages
  ⊕ ☑ DotNET feature packages —— 812
  ⊕ ☐ Tizen Recovery Feature
  ⊕ ☑ Device Setup Feature —— 811
  ⊕ ☑ SoftAP feature packages
  ⊕ ☑ Starter daemon and Menu screen App
  ⊕ ☐ Tizen Debug tools and Locale
  ⊕ ☐ Tizen Upgrade Feature
  ⊕ ☑ Web API feature packages Description ——830

Packages information

Name          Device Setup Feature
Version       0.0.1-7.1
Architecture  armv7l
Size          3KB
Installed Size  24Byte The packeges of Device Setup Feature is dependent on the DotNET feature packages.

Name          DotNET feature packages
Version       0.0.1-3.2
Architecture  armv7l

FIG. 8B

Start typing to filter list of packages

- ⊞ Tizen Native API Sets
- ⊟ Tizen Platform Internal Feature Sets
  - ⊞ ☑ Boot Animation packages
  - ⊞ ☐ DotNET feature packages
  - ⊞ ☑ Tizen Recovery Feature
  - ⊞ ☑ Device Setup Feature
  - ⊞ ☑ SoftAP feature packages
  - ⊞ ☐ Starter daemon and Menu screen App
  - ⊞ ☐ Tizen Debug tools and Locale
  - ⊞ ☐ Tizen Upgrade Feature
  - ⊞ ☑ Web API feature packages Description Notification — 850

Could not uncheck the DotNET feature packages because the packages of Device Setup Feature depends on it.

FIG. 9

Image Creation

Check the selected Package List and fill out the Image name and version. The image will be completed Package List
- building-blocks-sub1-Preset_img_headless-rpi3  — 910
- building-blocks-root-Preset_iot_core
- amd
- bash
- glibc
- filesystem
- setup Summary Image Name: tizen_iot_armv71

Image Version: v1.0

Image Size: 50MB

Image Installed Size: 152MB

SERVER FOR PROVIDING SOFTWARE PLATFORM AND METHOD OF OPERATING SERVER

CROSS-REFERENCE TO RELATED APPLICATION(S)

This application is based on and claims priority from U.S. Provisional Patent Application No. 62/506,165, filed on May 15, 2017, in the U.S. Patent and Trademark Office, U.S. Provisional Patent Application No. 62/506,758, filed on May 16, 2017, in the U.S. Patent and Trademark Office, and Korean Patent Application No. 10-2018-0050463, filed on May 2, 2018, in the Korean Intellectual Property Office, the disclosures of which are incorporated by reference herein in their entireties.

BACKGROUND

1. Field

The disclosure relates to a server for providing a software platform and a method of operating the server, and more particularly, to a server capable of intuitively providing software packages necessary for users of electronic devices, from among software packages that constitute a software platform, and a method of operating the server.

2. Description of Related Art

To mount a software platform on an electronic device and operate the software platform, a professional developers who understand the software platform well are needed, along with a special development infrastructure. In an initial developing stage of a product, a process of creating and testing a software platform by adding or deleting elements that constitute the software platform is repeated several times. At this time, a manufacturer mounts, on a target device, a platform image created by building all software packages of the software platform and uses the platform image. In addition, the manufacturer directly and manually reconstructs software packages as necessary, and thus optimizes the software packages in accordance with a product to be manufactured.

However, when a platform image is created by including all software packages, the manufacturer needs to determine whether specific software packages are necessary components for each product to be manufactured, and needs to individually ascertain and exclude unnecessary software packages. In this case, the vendor needs to have technical knowledge about software platforms to thereby separate necessary software packages from unnecessary software packages to constitute a software platform and thereby manufacture a software platform including optimized software packages.

SUMMARY

Provided are a server capable of creating a platform image with only software packages needed by a user, based on information about an electronic device that is to have a software platform mounted thereon, and a method of operating the server.

Provided are a server capable of providing information about a software package associated with a software package selected from a plurality of software packages, and a method of operating the server.

Additional aspects will be set forth in part in the description which follows and, in part, will be apparent from the description, or may be learned by practice of the presented embodiments.

In accordance with an aspect of the disclosure, a server for providing a software platform includes a communication interface; a memory storing at least one instruction; and a processor configured to execute the at least one instruction stored in the memory to: control the communication interface to receive, from a client device, information about an electronic device on which the software platform is to be mounted, and transmit, to the client device, information about software packages mountable on the electronic device, control the communication interface to receive, from the client device, a request for information about a first software package selected from among the software packages, detect a second software package associated with the first software package, and transmit, to the client device, the information about the first software package and information about the second software package, and create a platform image, based on software packages selected by the client device.

In accordance with another aspect of the disclosure, a method of operating a server for providing a software platform includes the operations of receiving, from a client device, information about an electronic device on which the software platform is to be mounted; transmitting, to the client device, information about software packages mountable on the electronic device; receiving, from the client device, a request for information about a first software package selected from among the software packages; detecting a second software package associated with the first software package; transmitting, to the client device, the information about the first software package and information about the second software package; and creating a platform image, based on software packages selected by the client device.

In accordance with another aspect of the disclosure, a method of operating a server for providing a software platform includes the operation of receiving, from a client device, information about an electronic device on which the software platform is to be mounted; transmitting, to the client device, a list of software packages mountable on the electronic device; receiving, from the client device, a selection of a first software package among the list of software packages; detecting a second software package associated with the first software package; transmitting, to the client device, information about the first software package and the second software package; receiving, from the client device, a request to create a platform image including at least the first software package and the second software package, based on software packages selected in accordance with the information about the first software package and the second software package; and creating the platform image based on the request to create the platform image.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6, 7A, 7B, 8A, 8B, 9, and 10 are diagrams used to explain user interfaces (UIs) provided by a server in order to constitute a software platform, according to an embodiment, and illustrate examples in which web pages provided by the server are displayed on a client device.

DETAILED DESCRIPTION

Figure 1:
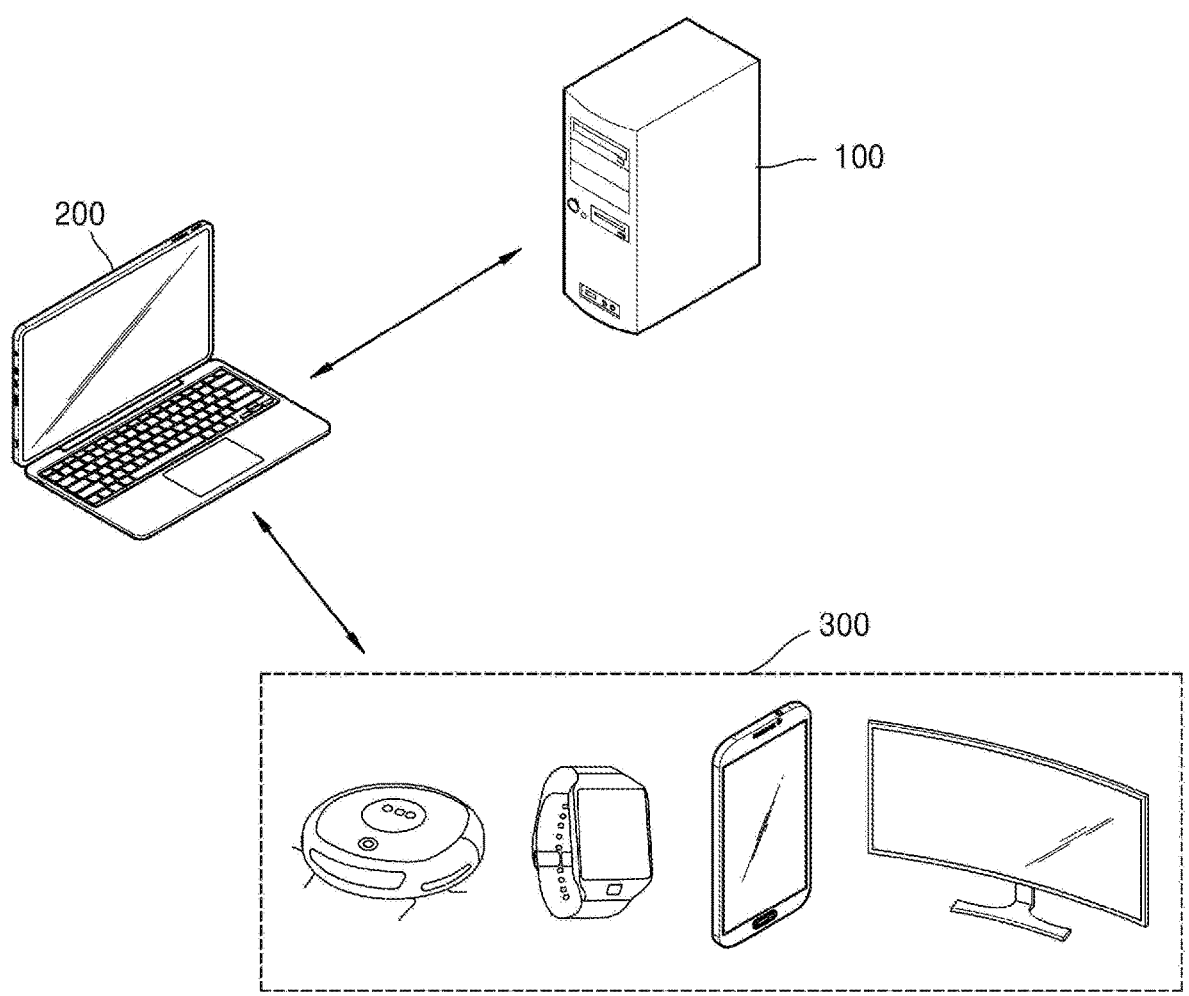
FIG. 1 is a schematic diagram illustrating a system that provides a software platform, according to an embodiment.

Hereinafter, the terms used in the specification will be briefly described, and then the disclosure will be described in detail.

Although general terms used herein were selected for describing the disclosure in consideration of the functions thereof, these general terms may vary according to intentions of one of ordinary skill in the art, case precedents, the advent of new technologies, and the like. Terms arbitrarily selected by the applicant of the disclosure may also be used in a specific case. In this case, their meanings need to be given in the detailed description. Hence, the terms must be defined based on their meanings and the contents of the entire specification, not by simply stating the terms.

The terms "comprises" and/or "comprising" or "includes" and/or "including" when used in this specification, specify the presence of stated elements, but do not preclude the presence or addition of one or more other elements. The terms "unit", "-er (-or)", and "module" when used in this specification refers to a unit in which at least one function or operation is performed, and may be implemented as hardware, software, or a combination of hardware and software.

Embodiments are described in detail herein with reference to the accompanying drawings so that this disclosure may be easily performed by one of ordinary skill in the art to which the disclosure pertain. The disclosure may, however, be embodied in many different forms and should not be construed as being limited to the embodiments set forth herein. In the drawings, parts irrelevant to the description are omitted for simplicity of explanation, and like numbers refer to like elements throughout.

FIG. 1 is a schematic diagram illustrating a system that provides a software platform, according to an embodiment.

The system that provides a software platform may include a server 100, a client device 200, and an electronic device 300.

The server 100 may provide a plurality of software packages that constitute the software platform. The server 100 may include a web server or a web application server (WAS), and may provide information about the software platform or the plurality of software packages to the client device 200 via a web. However, embodiments are not limited thereto.

The server 100 may communicate with the client device 200 via a network. The server 100 may include at least one component that enables communication via a local area network (LAN), a wide area network (WAN), a value added network (VAN), a mobile radio communication network, a satellite communication network, or a combination thereof. However, embodiments are not limited thereto.

The server 100 may receive information about the electronic device 300, which is to mount the software platform thereon, from the client device 200, and transmit information about software packages mountable on the electronic device 300 to the client device 200.

The server 100 may control a software package associated with a software package selected by the client device 200 to be detected and the detected software package to be automatically selected.

When the server 100 receives a platform image creation request from the client device 200, the server 100 may create a platform image, based on software packages selected by the client device 200.

The client device 200 may be realized in various types. For example, the client device 200 may be any type of electronic device, such as a mobile phone, a smartphone, a laptop computer, a desktop computer, a tablet PC, an e-book terminal, a digital broadcast terminal, a personal digital assistant (PDA), a portable multimedia player (PMP), a navigation device, an MP3 player, a camcorder, an internet protocol television (IPTV), a digital TV (DTV), or a wearable device. However, embodiments are not limited thereto.

The client device 200 may receive information about software packages mountable on the electronic device 300 from the server 100, and may provide the information to a client device user (for example, a software developer). For example, the client device 200 may display a list from which software packages may be selected. Accordingly, the client device user (for example, a software developer) may select a software package corresponding to a function or feature of software desired to be developed, from among a plurality of software packages. The client device 200 may receive an input of selection by a user and may send a request to the server 100 for information about the selected software package.

The client device 200 may receive, from the server 100, information about the selected software package and information about a software package associated with the selected software package, and may display the received information. The user may additionally select another software package or cancel the selection of the software package, based on the displayed information. However, embodiments are not limited thereto.

The client device 200 may send a request to the server 100 to create a platform image, and may download the platform image created by the server 100.

The client device 200 may mount the downloaded platform image on the electronic device 300, and the electronic device 300 having the platform image mounted thereon may execute corresponding software, based on the platform image. The electronic device 300 may be any type of electronic device, such as an IoT device, a mobile phone, a tablet PC, a digital camera, a camcorder, a laptop computer, a desktop computer, an e-book terminal, a digital broadcast terminal, a PDA, a PMP, a navigation device, an MP3 player, a wearable device, or consumer electronics (CE) devices (e.g., refrigerators and air-conditioners having display panels), but embodiments are not limited thereto.

The term "user" used herein denotes a person who controls a function or operation of the server 100, the client device 200, or the electronic device 300. Examples of the user may include a developer, a manager, or an installation engineer.

Figure 2:
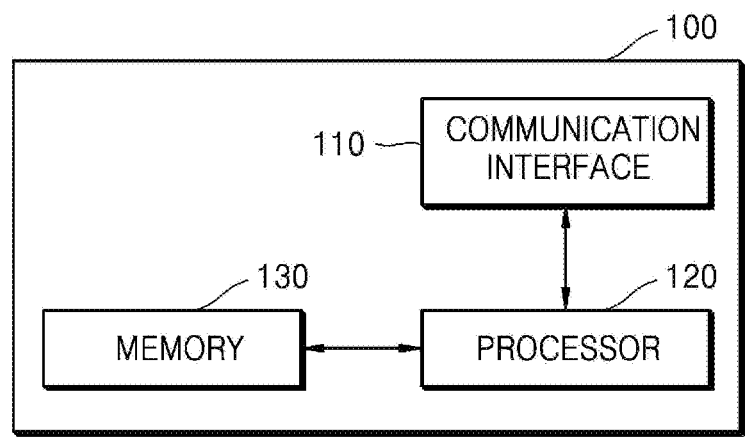
FIG. 2 is a block diagram of a server according to an embodiment.

FIG. 2 is a block diagram of the server 100 according to an embodiment.

Referring to FIG. 2, the server 100 may include a communication interface 110, a processor 120, and a memory 130.

The processor 120 may control the server 100. The processor 120 may execute at least one instruction stored in the memory 130.

The memory 130 may store various pieces of data, programs, or applications for driving and controlling the server 100. A program stored in the memory 130 may include at least one instruction. A program (at least one instruction) or application stored in the memory 130 may be executed by the processor 120.

The communication interface 110 may transmit or receive data or a signal to or from an external apparatus or an external server under the control of the processor 120. For example, the processor 120 may control the communication interface 110 to transmit or receive data or a signal to or from the client device 200 via a network.

The communication interface 110 may include at least one component that enables communication via a LAN, a WAN, a VAN, a mobile radio communication network, a satellite communication network, or a combination thereof. The communication interface 110 may wirelessly transmit or receive data or a signal to or from the external apparatus or the external server by directly using a wireless LAN (for example, Wi-Fi).

The communication interface 110 may receive information about an electronic device that is to mount a software platform thereon, from the client device 200, under the control of the processor 120, and transmit information about software packages mountable on the electronic device to the client device 200. The information about the software packages may be information about a plurality of software packages classified and grouped according to a device on which a software package is to be mounted, a function or feature of provided software, or setting of an application programming interface (API). For example, the information about the software packages may include information about software packages that may be included or need to be included in a software platform, according to the type of device on which the software platform is to be mounted. The information about the software packages may include information about software packages that may be included or need to be included, according to the function or feature of software that is provided. The information about the software packages may include information about software packages that may be included or need to be included, according to an API that is used. However, embodiments are not limited thereto, and a plurality of packages may be classified according to various criterions.

The communication interface 110 may transmit correlation information of software packages to the client device 200 under the control of the processor 120. For example, when the client device 200 selects a first software package, the processor 120 may detect a second software package associated with the selected first software package. The second software package may be a software package needed to be included in order to execute the first software package, or a software package needed to be included together with the first software package in order to optimize execution of the software platform. The communication interface 110 may transmit first software package information and second software package information to the client device 200 under the control of the processor 120.

The communication interface 110 may receive a platform image creation request from the client device 200 under the control of the processor 120. The processor 120 may create a platform image, based on software packages selected by the client device 200. For example, the processor 120 may create a configuration file including the software packages selected by the client device 200, and may create a platform image by using the created configuration file.

The server 100 may store the created configuration file or platform image in the memory 130 of the server 100 or an external storage device. For example, at the request of the client device 200, the server 100 may store the created configuration file or platform image in correspondence with the client device 200. The server 100 may create a database (DB) for each client device user and may store a configuration file or a platform image in the created DB.

The server 100 may transmit the created configuration file or platform image to the client device 200.

The block diagram of the server 100 illustrated in FIG. 2 is merely one embodiment, and the components illustrated in FIG. 2 may be combined or omitted according to the specifications of the server 100 when being actually implemented, or additional components may be included in the block diagram of FIG. 2. In other words, two or more components may be combined into a single component, or a single component may be divided into two or more components. A function performed in each block is merely an example to explain embodiments, and a detailed operation or device of each block does not limit the scope of the embodiments.

Figure 3:
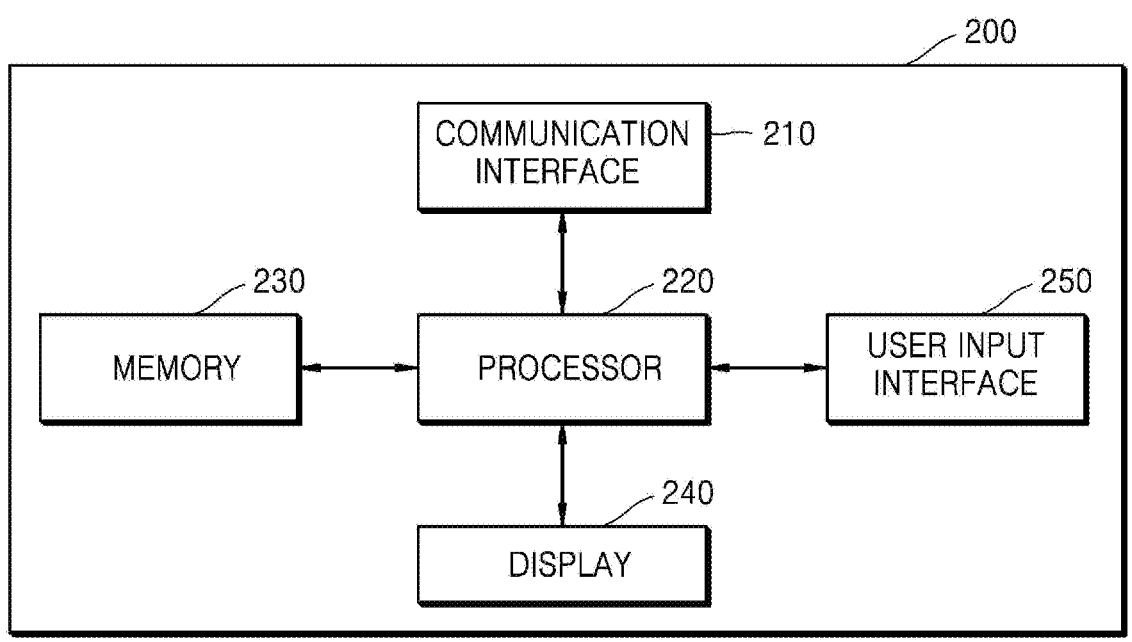
FIG. 3 is a block diagram of a client device according to an embodiment.

FIG. 3 is a block diagram of the client device 200 according to an embodiment.

Referring to FIG. 3, the client device 200 may include a communication interface 210, a processor 220, a memory 230, a display 240, and a user input interface 250.

The communication interface 210 may transmit or receive data or a signal to or from an external apparatus or an external server. The communication interface 210 may include at least one component that enables communication via a LAN, a WAN, a VAN, a mobile radio communication network, a satellite communication network, or a combination thereof. The communication interface 210 may wirelessly transmit or receive data or a signal to or from the external apparatus or the external server by directly using a wireless LAN (for example, Wi-Fi).

For example, the communication interface 210 may transmit login information of a user of the client device 200. The communication interface 210 may send a request to the server 100 for information about software packages which may be provided by the server 100 and receive the information from the server 100. The communication interface 210 may send a request to the server 100 for information about a software package associated with a software package selected from the plurality of software packages by the client device 200 under the control of the processor 220, and may receive the information about the software package associated with the selected software package from the server 100.

The communication interface 210 may download a platform image from the server 100 under the control of the processor 220 and may mount the downloaded platform image on the electronic device 300. Alternatively, the communication interface 210 may transmit a new software package to the server 100.

The processor 220 may control the client device 200. The processor 220 may execute at least one instruction stored in the memory 230.

The memory 230 may store various pieces of data, programs, or applications for driving and controlling the client device 200. A program stored in the memory 230 may include at least one instruction. A program (at least one instruction) or application stored in the memory 230 may be executed by the processor 220.

The display 240 may generate a driving signal by converting an image signal, a data signal, an on-screen display (OSD) signal, and a control signal that are processed by the processor 220. The display 240 may be a plasma display panel (PDP), a liquid-crystal display (LCD), an organic light-emitting device (OLED), a flexible display, or a 3-dimensional (3D) display. The display 240 may be configured as a touch screen, and thus may serve as an input device as well as an output device.

The display 240 may display a web page received from the server 100. The web page displayed on the display 240 may include a user interface (UI) for constituting a software platform. For example, the web page may include an electronic device list from which an electronic device to mount a software platform thereon may be selected, and a package list from which a software package may be selected.

The user input interface 250 denotes a unit via which a user inputs data for controlling the client device 200. For example, the user input interface 250 may be, but is not limited to, a key pad, a dome switch, a touch pad (e.g., a capacitive overlay type, a resistive overlay type, an infrared beam type, an integral strain gauge type, a surface acoustic wave type, a piezo electric type, or the like), a jog wheel, or a jog switch.

The user input interface 250 may receive an input of selecting an electronic device which is to mount a software platform thereon from the electronic device list displayed on the display 240, or an input of selecting at least one software package from the package list.

The block diagram of the client device 200 illustrated in FIG. 3 is merely one embodiment, and the components illustrated in FIG. 3 may be combined or omitted according to the specifications of the client device 200 when being actually implemented, or additional components may be included in the block diagram of FIG. 3. In other words, two or more components may be combined into a single component, or a single component may be divided into two or more components. A function performed in each block is merely an example to explain embodiments, and a detailed operation or device of each block does not limit the scope of the embodiments.

Figure 4:
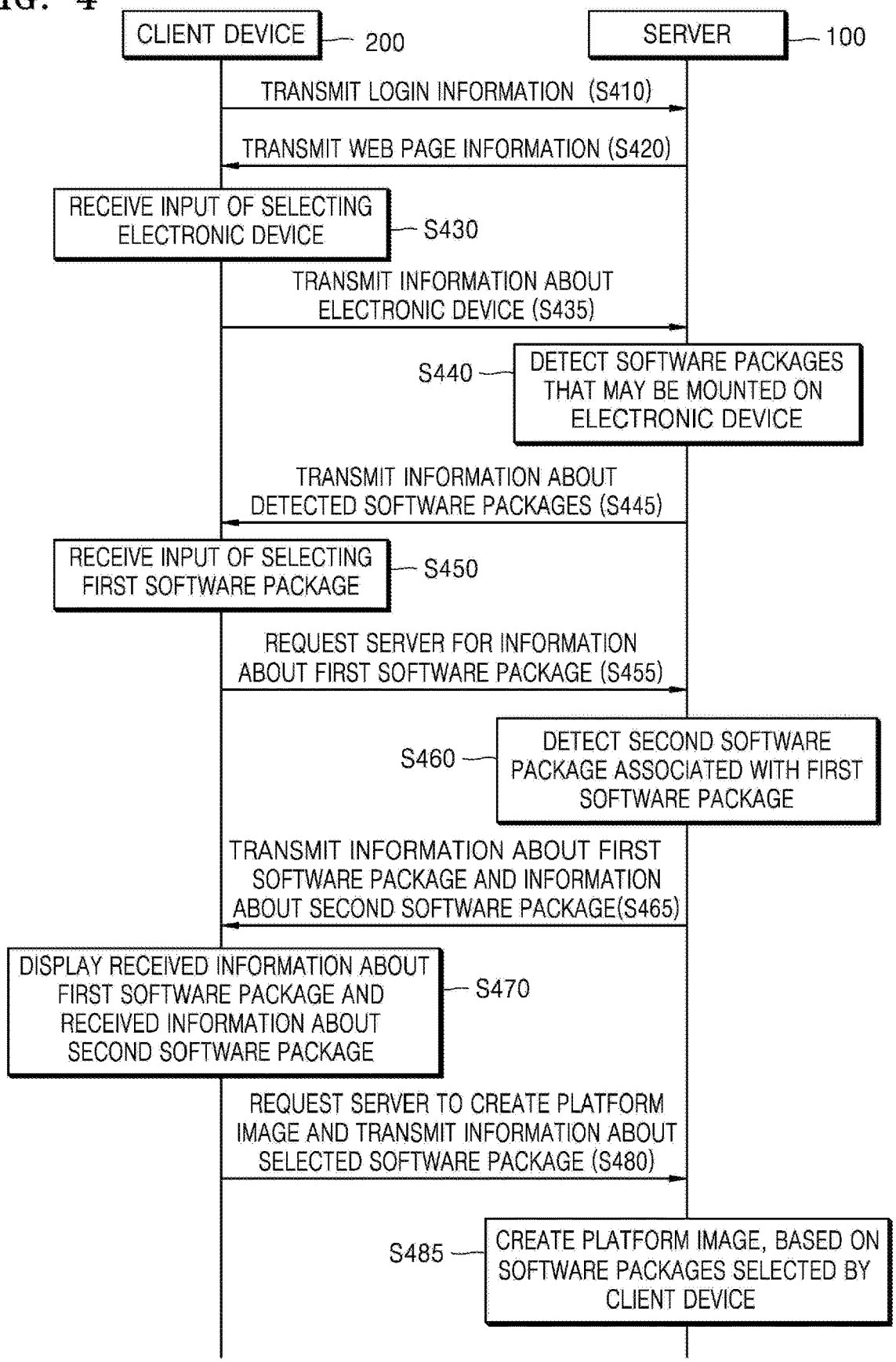
FIG. 4 is a flowchart of a method of operating a system including a client device and a server and providing a software platform, according to an embodiment.

FIG. 4 is a flowchart of a method of operating a system including a client device and a server and providing a software platform, according to an embodiment.

Referring to FIG. 4, in operation S410, after the client device 200 connects to a web site provided by the server 100, the client device 200 may log in into the web site by using login information of a user of the client device 200. In operation S420, the client device 200 may receive web page information from the server 100. The client device 200 may display a web page according to the received web page information.

The web page may include a UI for constituting a software platform. For example, the web page may include an electronic device list including a plurality of electronic devices capable of mounting a software platform provided by the server 100. The web page may be configured to be able to select the plurality of electronic devices included in the electronic device list, but embodiments are not limited thereto.

The client device 200 may receive an input of selecting, from the electronic device list, an electronic device which is to mount the software platform thereon, in operation S430, and may transmit information about the electronic device to the server 100, in operation S435.

The server 100 may detect software packages that may be mounted on the electronic device, in operation S440, and may transmit information about the detected software packages to the client device 200, in operation S445.

The information about the software packages may be information about a plurality of software packages classified and grouped according to a device on which a software package is to be mounted, a function or feature of provided software, or setting of an API. For example, the information about the software packages may include information about software packages that may be included or need to be included in a software platform, according to the type of device on which the software platform is to be mounted. The information about the software packages may include information about software packages that may be included or need to be included, according to the function or feature of software that is provided. The information about the software packages may include information about software packages that may be included or need to be included, according to an API that is used. However, embodiments are not limited thereto, and a plurality of packages may be classified according to various criterions.

The client device 200 may receive an input of selecting a first software package from the software packages, based on the information about the software packages received from the server 100, in operation S450, and may send a request to the server 100 for information about the first software package, in operation S455.

In operation S460, the server 100 may detect a second software package associated with the first software package. For example, the second software package may be a software package that needs to be included to execute the first software package. Alternatively, the second software package may be a software package that needs to be included together with the first software package in order to optimize execution of the software platform. However, embodiments are not limited thereto.

In operation S465, the server 100 may transmit the information about the first software package and information about the second software package to the client device 200.

In operation S470, the client device 200 may display the received information about the first software package and the received information about the second software package. For example, the client device 200 may display names, sizes, installed sizes, version information, and brief descriptions of the first software package and the second software package.

When the first software package is selected by the client device 200, the server 100 may control the second software package to be automatically selected. When the selection of the first software package is cancelled by the client device 200, the server 100 may control the section of the second software package to be automatically cancelled.

When selection of a software package is completed based on software package information, the client device 200 may send a request to the server 100 to create a platform image, and may transmit information about a selected software package to the server 100, in operation S480.

In operation S485, the server 100 may create a platform image, based on software packages selected by the client device 200. For example, the server 100 may create a configuration file including the software packages selected by the client device 200, and may create a platform image by using the created configuration file.

The server 100 may store the created configuration file or platform image in the memory 130 of the server 100 or an external storage device. For example, at the request of the client device 200, the server 100 may store the created configuration file or platform image in correspondence with the client device 200. The server 100 may create a DB for each client device user and may store a configuration file or a platform image in the created DB.

The server 100 may transmit the created configuration file or platform image to the client device 200.

Figure 5:
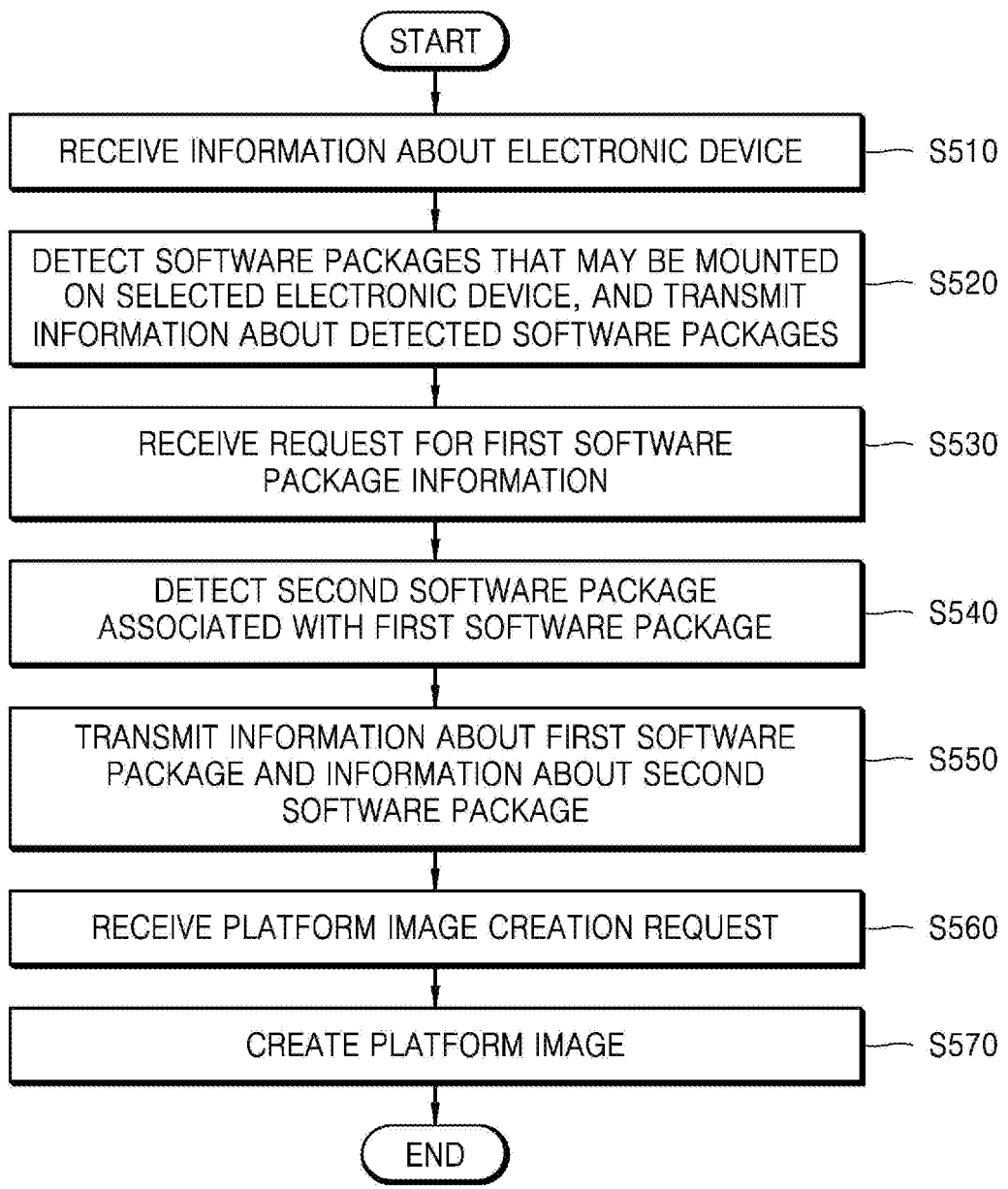
FIG. 5 is a flowchart of a method of operating a server, according to an embodiment.

FIG. 5 is a flowchart of a method of operating the server 100, according to an embodiment.

Referring to FIG. 5, in operation S510, the server 100 may receive information about an electronic device that is to mount a software platform thereon, from the client device 200.

For example, the server 100 may transmit an electronic device list from which an electronic device may be selected to the client device 200, and may receive information about an electronic device selected by the client device 200.

In operation S520, the server 100 may detect software packages that may be mounted on the selected electronic device, based on the received information about the selected electronic device, and may transmit information about the detected software packages to the client device 200. The information about the software packages may be information about a plurality of software packages classified and grouped according to a device on which a software package is to be mounted, a function or feature of provided software, or setting of an API. For example, the information about the software packages may include information about software packages that may be included or need to be included in a software platform, according to the type of device on which the software platform is to be mounted. The information about the software packages may include information about software packages that may be included or need to be included, according to the function or feature of software that is provided. The information about the software packages may include information about software packages that may be included or need to be included, according to an API that is used. However, embodiments are not limited thereto, and a plurality of packages may be classified according to various criteria.

When the server 100 receives a request for first software package information from the client device 200 in operation S530, the server 100 may detect a second software package associated with a first software package, in operation S540. For example, when the server 100 receives a request for selecting the first software package from the client device 200, it may be considered that the server 100 has been requested for information about the first software package.

The second software package may be a software package that needs to be included to execute the first software package. Alternatively, the second software package may be a software package that needs to be included together with the first software package in order to optimize execution of the software platform. However, embodiments are not limited thereto.

In operation S550, the server 100 may transmit the information about the first software package and information about the second software package to the client device 200.

The information about the first software package information and the information about the second software package may include, but are not limited to, names, sizes, installed sizes, version information, and brief descriptions of the first software package and the second software package.

When the first software package is selected by the client device 200, the server 100 may control the second software package to be automatically selected. When the selection of the first software package is cancelled by the client device 200, the server 100 may control the section of the second software package to be automatically cancelled.

When the server 100 receives a platform image creation request from the client device 200 in operation S560, the server 100 may create a platform image, based on software packages selected by the client device 200, in operation S570. For example, the server 100 may create a configuration file including the software packages selected by the client device 200, and may create a platform image by using the created configuration file.

The server 100 may store the created configuration file or platform image in the server 100 or an external storage device. For example, at the request of the client device 200, the server 100 may store the created configuration file or platform image in correspondence with the client device 200. The server 100 may create a DB for each client device user and may store a configuration file or a platform image in the created DB.

The server 100 may transmit the created configuration file or platform image to the client device 200.

FIGS. 6 through 10 are diagrams used to explain UIs provided by a server in order to constitute a software platform, according to an embodiment. The diagrams illustrate examples in which web pages provided by the server are displayed on a client device.

Figure 6:
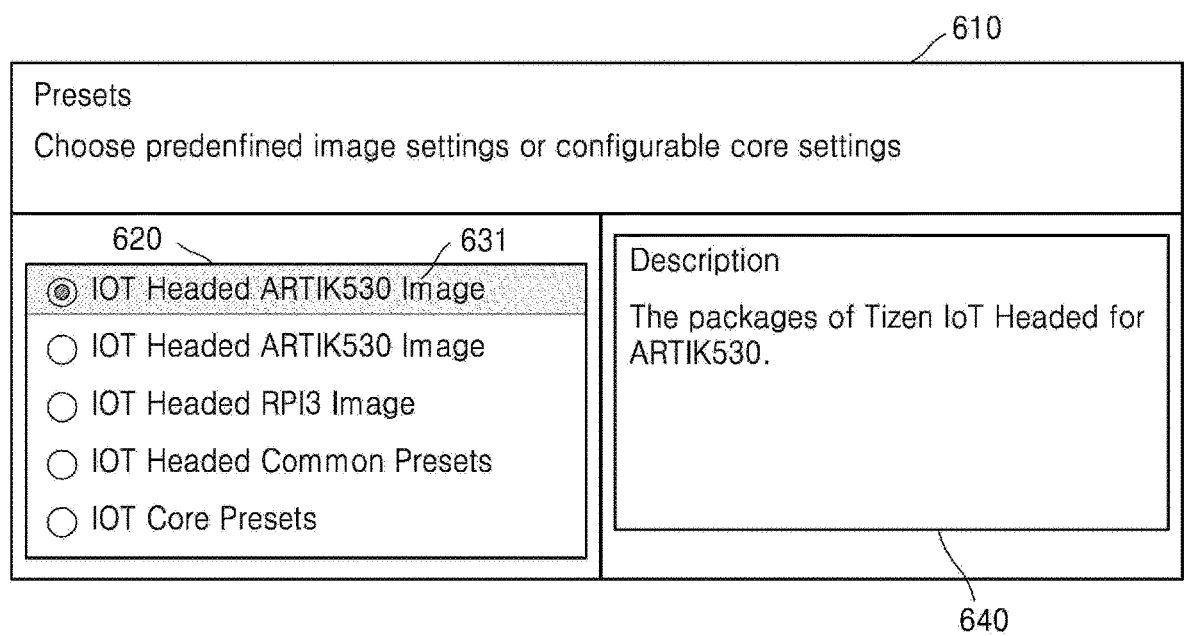

Referring to FIG. 6, a web page 610 may include an electronic device list 620. The electronic device list is a list from which an electronic device on which a software platform is to be mounted may be selected, and may include items respectively representing a plurality of electronic devices. The items may be expressed as respective product names of the plurality of electronic devices, but embodiments are not limited thereto. The items may be expressed as brief descriptions or the like respectively representing the electronic devices.

The client device 200 may receive a user input of selecting a first item 631 from the plurality of items. When the first item 631 is selected, software packages corresponding to the first item 631 may be automatically selected. For example, the software packages that are automatically selected may be packages that need to be included such that an electronic device corresponding to the first item 631 operates a software platform. The client device 200 may receive information 640 about the selected software packages from the server 100 and display the received information 640.

Figure 7A:
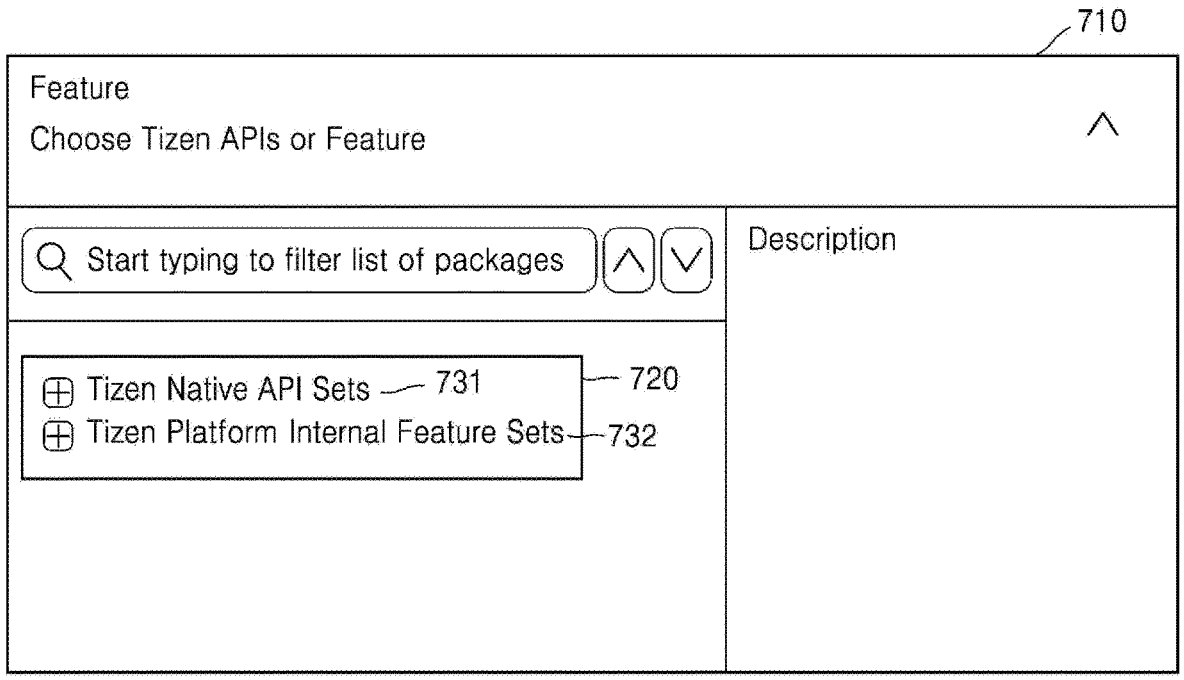

Referring to FIG. 7A, a web page 710 may include a list 720 in which a plurality of software packages which may be provided by the server 100 are classified and grouped according to a supported API or a function or feature of the provided software.

Figure 7B:
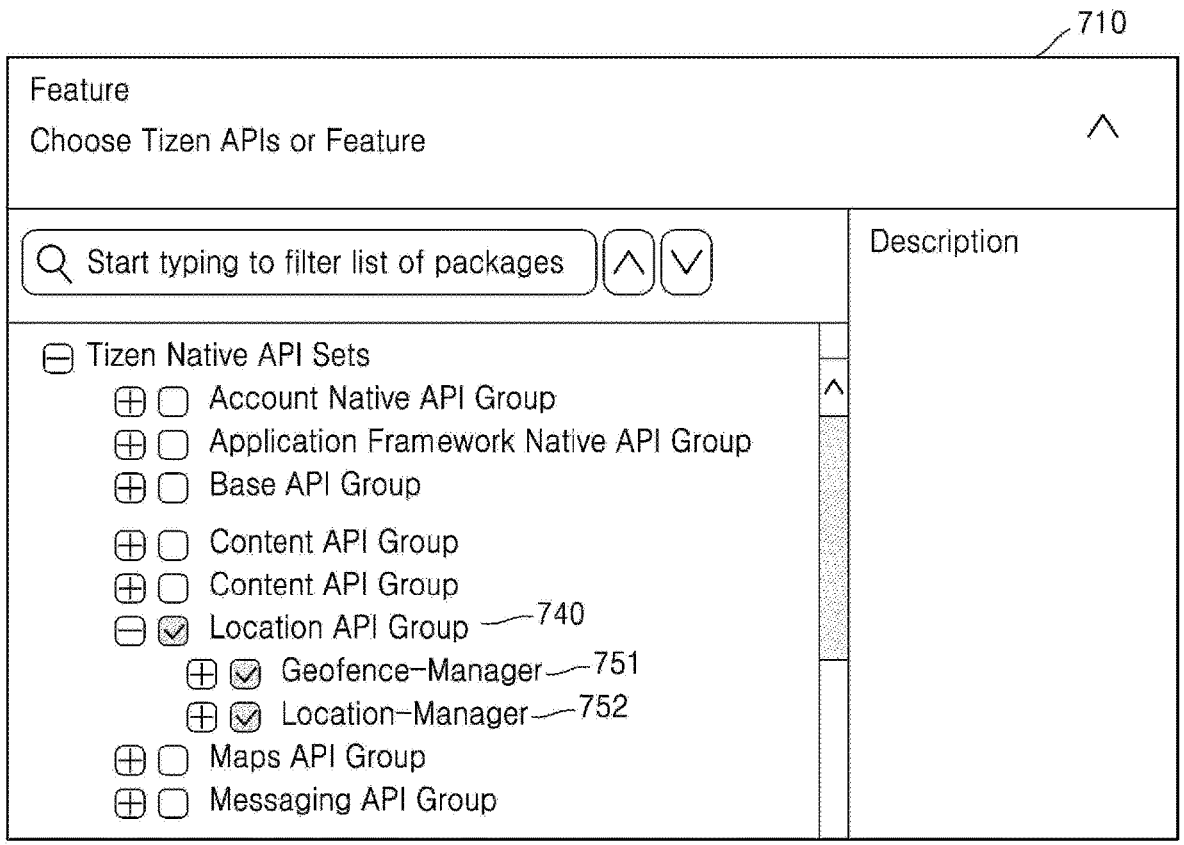

For example, the client device 200 may receive a user input of selecting an API setting item 731 from the list 720. When the API setting item 731 is selected, the client device 200 may receive, from the server 100, information about software packages classified by the supported API from among the plurality of software packages which may be provided by the server 100. As shown in FIG. 7B, the client device 200 may display the classified software packages as sub-items of the API setting item 731, based on information received from the server 100.

Referring to FIG. 7B, when a second item 740 (for example, Location API Group) is selected from the sub-items displayed on the web page 710, sub-items 751 and 752 of the second item 740 may be all automatically selected. Alternatively, only one of the sub-items 751 and 752 of the second item 740 may be selected based on a user input.

On the other hand, the client device 200 may receive a user input of selecting a function setting item 732 from the list 720 of FIG. 7A. When the function setting item 732 is selected, the client device 200 may receive, from the server 100, information about software packages classified by the function or features of the provided software from among the plurality of software packages which may be provided by the server 100. As shown in FIG. 8A, the client device 200 may display the classified software packages as sub-items of the function setting item 732, based on information received from the server 100.

The client device 200 may receive a user input of selecting at least one item from the sub-items. For example, the client device 200 may receive a user input of selecting a third item 811 (for example, Device Setup Feature) from the sub-items displayed on a web page. At this time, the server 100 may control a second software package (for example, a DotNET feature package) associated with a first software package (for example, a Device Setup Feature package) corresponding to the selected third item 811 to be automatically selected. For example, the second software package may be a software package that needs to be included to execute the first software package. Alternatively, the second software package may be a software package that needs to be included together with the first software package in order to optimize execution of the software platform. However, embodiments are not limited thereto.

For example, the client device 200 may transmit a request for information about the selected first software package to the server 100. The server 100 may detect the second software package associated with the first software package and may transmit information about the first software package and information about the second software package to the client device 200. The client device 200 may receive, from the server 100, information indicating that the second software package is associated with the first software package, and may control the second software package to be automatically selected. Accordingly, an item 812 corresponding to the associated second software package may be automatically selected by the client device 200.

The client device 200 may display the information about the first software package and the information about the second software package received from the server 100, and may also display information 830 indicating that the first software package and the second software package are associated with each other.

Referring to FIG. 8B, the client device 200 may receive a user input of deselecting a selected software package. At this time, when the software package attempted to be deselected is associated with another selected software package, the client device 200 may display a notification message 850 received from the server 100.

For example, when the first software package (for example, the Device Setup Feature package) and the second software package (for example, the DotNET feature package) have been selected and a user input of deselecting the second software package associated with the first software package is received, the client device 200 may display the notification message 850 representing that the second software package is associated with the first software package. Accordingly, a user may easily distinguish a software package necessary for constituting a software platform from a software package unnecessary for constituting the software platform, without technical knowledge about software packages.

When selection of necessary software packages is completed, the user may click an "image creation" icon. In response to an image creation request input (for example, a user input of clicking the "image creation" icon), the client device 200 may send a request to the server 100 to create a platform image. The server 100 may create a platform image, based on software packages selected by the client device 200. For example, the server 100 may create a configuration file including the software packages selected by the client device 200, and may create a platform image by using the created configuration file.

The server 100 may transmit a result of creating the platform image to the client device 200, and, as shown in FIG. 9, the client device 200 may display the result of creating the platform image. For example, the client device 200 may display information 910 about the software packages included in the created platform image, an image name, an image version, an image size, and an image installed size. The image name or the image version may be received from the user. The client device 200 may download the created configuration file or platform image.

Figure 10:
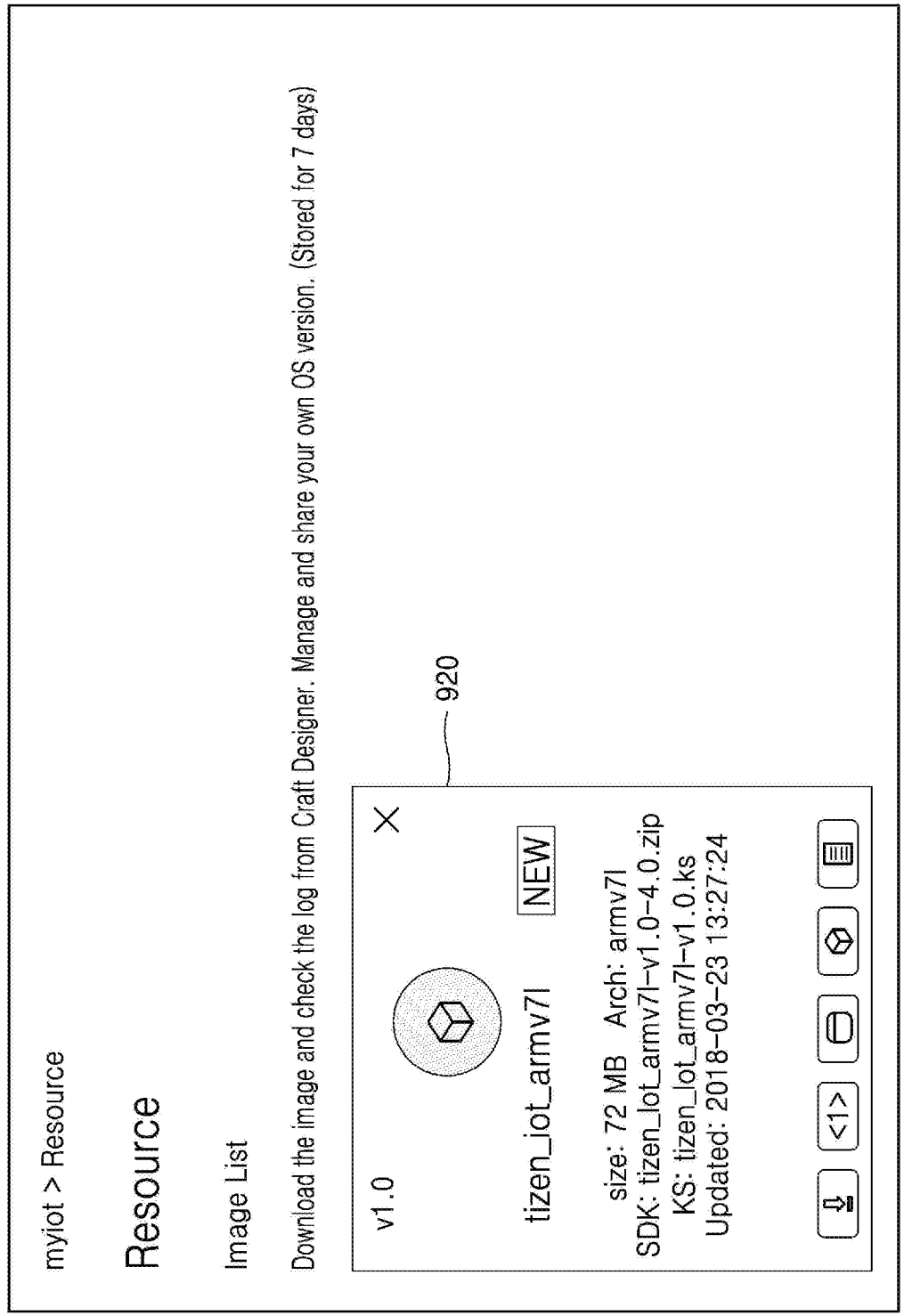

The server 100 may store the created configuration file or platform image in the server 100 or an external storage device. The server 100 may store the configuration file or the platform image in correspondence with login information of the user. Accordingly, as shown in FIG. 10, the server 100 may provide a previously created and stored configuration file or platform image 920, based on login information of a user connected to the server 100.

The client device 200 may download the configuration file or platform image stored in the server 100. Alternatively, the client device 200 may correct the created configuration file, based on a user input. The server 100 may re-create a platform image with the corrected configuration file.

The client device 200 may transmit, to the server 100, a software package that is different from the software packages provided by the server 100. The server 100 may store the received software package and add the received software package to a software package list to thereby configure a new package list. The server 100 may provide the new package list to the client device 200.

A user according to an embodiment may create a platform image with only software packages needed by the user without any special knowledge about software packages.

A server according to an embodiment may automatically detect and provide a software package that needs to be included to execute a selected software package.

Accordingly, the user may easily create a software platform.

A method of operating an electronic device according to an embodiment may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for embodiments or may be well-known to and be usable by one of ordinary skill in the art of computer software. Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a random-access memory (RAM), or a flash memory. Examples of the program commands are advanced language codes that can be executed by a computer by using an interpreter or the like as well as machine language codes made by a compiler.

Also, a server or a method of operating the server according to the disclosed embodiments may be provided in the form of a computer program product. The computer program product may be traded as a commodity between a seller and a purchaser.

The computer program product may include a software program and a computer-readable storage medium having the software program stored thereon. For example, the computer program product may include a product in the form of a software program (e.g., a downloadable app) that is electronically distributed through the manufacturer of an electronic device or an electronic market. For electronic distribution, at least a portion of the software program may be stored on a storage medium or may be created temporarily. In this case, the storage medium may be a server of a manufacturer, a server of an electronic market, or a storage medium of a relay server for temporarily storing a software program.

The computer program product may include, in a system including a server and a client device, a storage medium of the server or a storage medium of the client device. Alternatively, when there is a third device (e.g., a smartphone) in communication with the server or client device, the computer program product may include a storage medium of the third device. Alternatively, the computer program product may include the software program itself transmitted from the server to the client device or the third device, or transmitted from the third device to the client device.

In this case, one of the server, the client device, and the third device may execute the computer program product to perform the methods according to the disclosed embodiments. Alternatively, at least two of the server, the client device, and the third device may execute the computer program product to distribute and perform the methods according to the disclosed embodiments.

For example, a server (e.g., a cloud server or an artificial intelligence server) may execute a computer program product stored on a server to control a client device communicating with the server to perform the methods according to the disclosed embodiments.

The above-described embodiments should be considered in descriptive sense only and not for purposes of limitation. Descriptions of features or aspects within each embodiment should typically be considered as available for other similar features or aspects in other embodiments.

While embodiments been particularly shown and described, it will be understood by those of ordinary skill in the art that various changes in form and details may be made therein without departing from the spirit and scope of the present disclosure as defined by the following claims.

What is claimed is:

1. A server for providing a software platform, the server comprising:
    a communication interface;
    a memory that stores at least one instruction; and
    a processor configured to execute the at least one instruction stored in the memory to:
        control the communication interface to transmit, to a first electronic device, a list of other electronic devices,
        obtain, from the first electronic device via the communication interface, a selection of a second electronic device, from the list of other electronic devices, on which the software platform is to be mounted, the second electronic device being different from the first electronic device,
        transmit, to the first electronic device, information about software packages mountable on the second electronic device,
        obtain, from the first electronic device via the communication interface, a request for information about a first software package selected from among the software packages,
        detect a second software package associated with the first software package,
        control the communication interface to transmit, to the first electronic device, the information about the first software package and information about the second software package,
        obtain, from the first electronic device via the communication interface, a platform image creation request for creating a platform image that includes at least the first software package and the second software package, based on software packages selected in accordance with the information about the first software package and the information about the second software package,
        create a configuration file based on the software packages selected in accordance with the information about the first software package and the information about the second software package, and
        create the platform image, based on the created configuration file.

2. The server of claim 1, wherein the processor is further configured to execute the at least one instruction to control the communication interface to transmit, to the first electronic device, a package list in which the software packages mountable on the second electronic device are classified according to a preset criterion.

3. The server of claim 1, wherein the second software package is required to execute the first software package.

4. The server of claim 1, wherein the processor is further configured to execute the at least one instruction to:
    based on a selection of the first software package by the first electronic device, control the second software package to be automatically selected, and
    based on deselection of the first software package by the first electronic device, control the second software package to be automatically deselected.

5. The server of claim 1, wherein the processor is further configured to execute the at least one instruction to control the communication interface to transmit, to the first electronic device, the created platform image, based on a platform image download request obtained from the first electronic device.

6. The server of claim 1, wherein the processor is further configured to execute the at least one instruction to control the created platform image to be stored in correspondence with the first electronic device, based on login information corresponding to the first electronic device.

7. The server of claim 6, wherein
    the communication interface is configured to obtain the login information corresponding to the first electronic device, and
    the processor is further configured to execute the at least one instruction to control the communication interface to transmit, to the first electronic device, information, about the created platform image stored in correspondence with the first electronic device, to be transmitted to the first electronic device, based on the login information.

8. The server of claim 1, wherein the processor is further configured to execute the at least one instruction to:
    obtain, from the first electronic device, a request to correct the configuration file, which corresponds to the platform image, correct the configuration file corresponding to the platform image, and re-create the platform image, based on the corrected configuration file.

9. A method of operating a server for providing a software platform, the method comprising:

transmitting, to a first electronic device, a list of other electronic devices;

obtaining, from the first electronic device, a selection of a second electronic device, from the list of other electronic devices, on which the software platform is to be mounted, the second electronic device being different from the first electronic device;

transmitting, to the first electronic device, information about software packages mountable on the second electronic device;

obtaining, from the first electronic device, a request for information about a first software package selected from among the software packages;

detecting a second software package associated with the first software package;

transmitting, to the first electronic device, the information about the first software package and information about the second software package;

obtaining, from the first electronic device, a platform image creation request for creating a platform image that includes at least the first software package and the second software package, based on software packages selected in accordance with the information about the first software package and the information about the second software package;

creating a configuration file based on the software packages selected in accordance with the information about the first software package and the information about the second software package; and creating the platform image, based on the created configuration file.

10. The method of claim 9, wherein the transmitting of the information about the software packages mountable on the second electronic device to the first electronic device comprises transmitting, to the first electronic device, a package list in which the software packages mountable on the second electronic device are classified according to a preset criterion.

11. The method of claim 9, wherein the second software package is a software package required to execute the first software package.

12. The method of claim 9, further comprising:

based on a selection of the first software package by the first electronic device, controlling the second software package to be automatically selected; and based on deselection of the first software package by the first electronic device, controlling the second software package to be automatically deselected.

13. The method of claim 9, further comprising:

obtaining a platform image download request from the first electronic device; and transmitting the created platform image to the first electronic device based on the platform image download request being obtained.

14. The method of claim 9, further comprising storing the created platform image in correspondence with the first electronic device, based on login information corresponding to the first electronic device.

15. The method of claim 14, further comprising:

obtaining the login information corresponding to the first electronic device; and transmitting, to the first electronic device, information about the platform image stored in correspondence with the first electronic device, based on the login information.

16. The method of claim 9, further comprising:

obtaining, a request to correct the configuration file, which corresponds to the platform image from the first electronic device;

correcting the configuration file corresponding to the platform image; and re-creating the platform image, based on the corrected configuration file.

17. A non-transitory computer-readable recording medium having recorded thereon a computer program which is executable by a computer to perform a method of operating a server for providing a software platform, the method comprising:

transmitting, to a first electronic device, a list of other electronic devices;

obtaining, from the first electronic device, a selection of a second electronic device, from the list of other electronic devices, on which the software platform is to be mounted, the second electronic device being different from the first electronic device;

transmitting, to the first electronic device, information about software packages mountable on the second electronic device;

obtaining, from the first electronic device, a request for information about a first software package selected from among the software packages;

detecting a second software package associated with the first software package;

transmitting, to the first electronic device, the information about the first software package and information about the second software package;

obtaining, from the first electronic device, a platform image creation request for creating a platform image that includes at least the first software package and the second software package, based on software packages selected in accordance with the information about the first software package and the information about the second software package;

creating a configuration file based on the software packages selected in accordance with the information about the first software package and the information about the second software package; and creating the platform image, based on the created configuration file.

18. A method of operating a server for providing a software platform, the method comprising:

transmitting, to a first electronic device, a list of other electronic devices;

obtaining, from the first electronic device, a selection of a second electronic device on which the software platform is to be mounted;

transmitting, to the first electronic device, a list of software packages mountable on the second electronic device;

obtaining, from the first electronic device, a user selection of a first software package among the list of software packages;

detecting a second software package associated with the first software package corresponding to the user selection;

transmitting, to the first electronic device, information about the first software package and the second software package;

obtaining, from the first electronic device, a platform image creation request for creating a platform image that includes at least the first software package and the second software package, based on software packages selected in accordance with the information about the first software package and the second software package;

creating a configuration file based on the software packages selected in accordance with the information about the first software package and the information about the second software package; and creating the platform image based on the created configuration file.

\* \* \* \* \*